March 8, 1949.  D. G. ROOS ET AL  2,464,059
POWER TAKE-OFF MECHANISM
Filed March 10, 1945  3 Sheets-Sheet 1
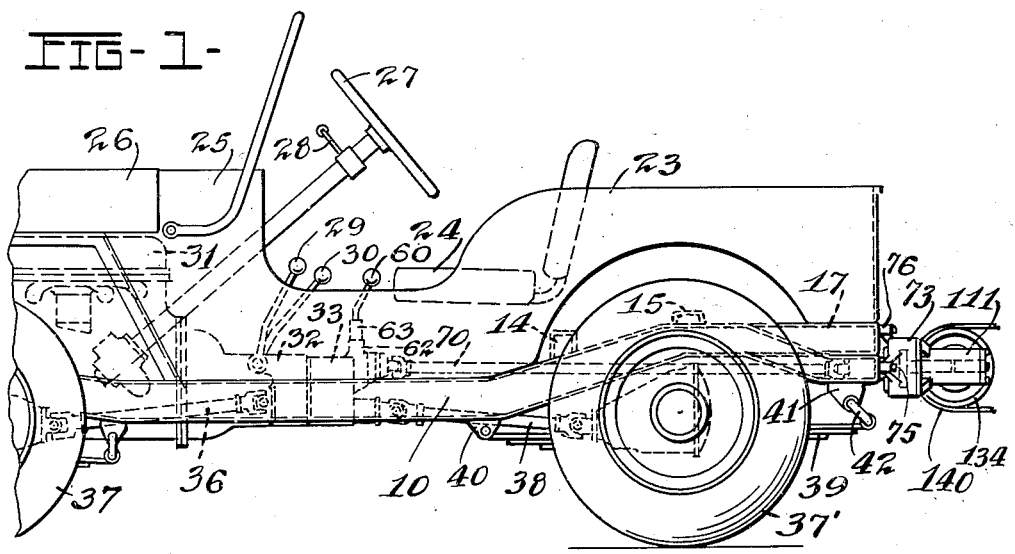
Fig-1-
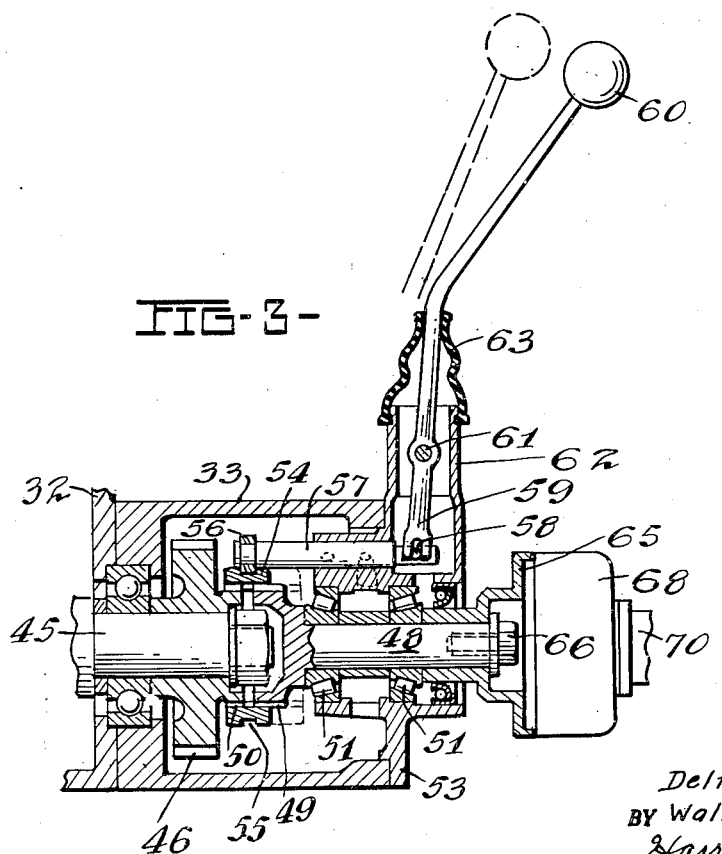
Fig-3-
INVENTORS.
Delmar G. Roos
BY Walter F. Benning
Harry O. Ernsberger
ATTORNEYS.

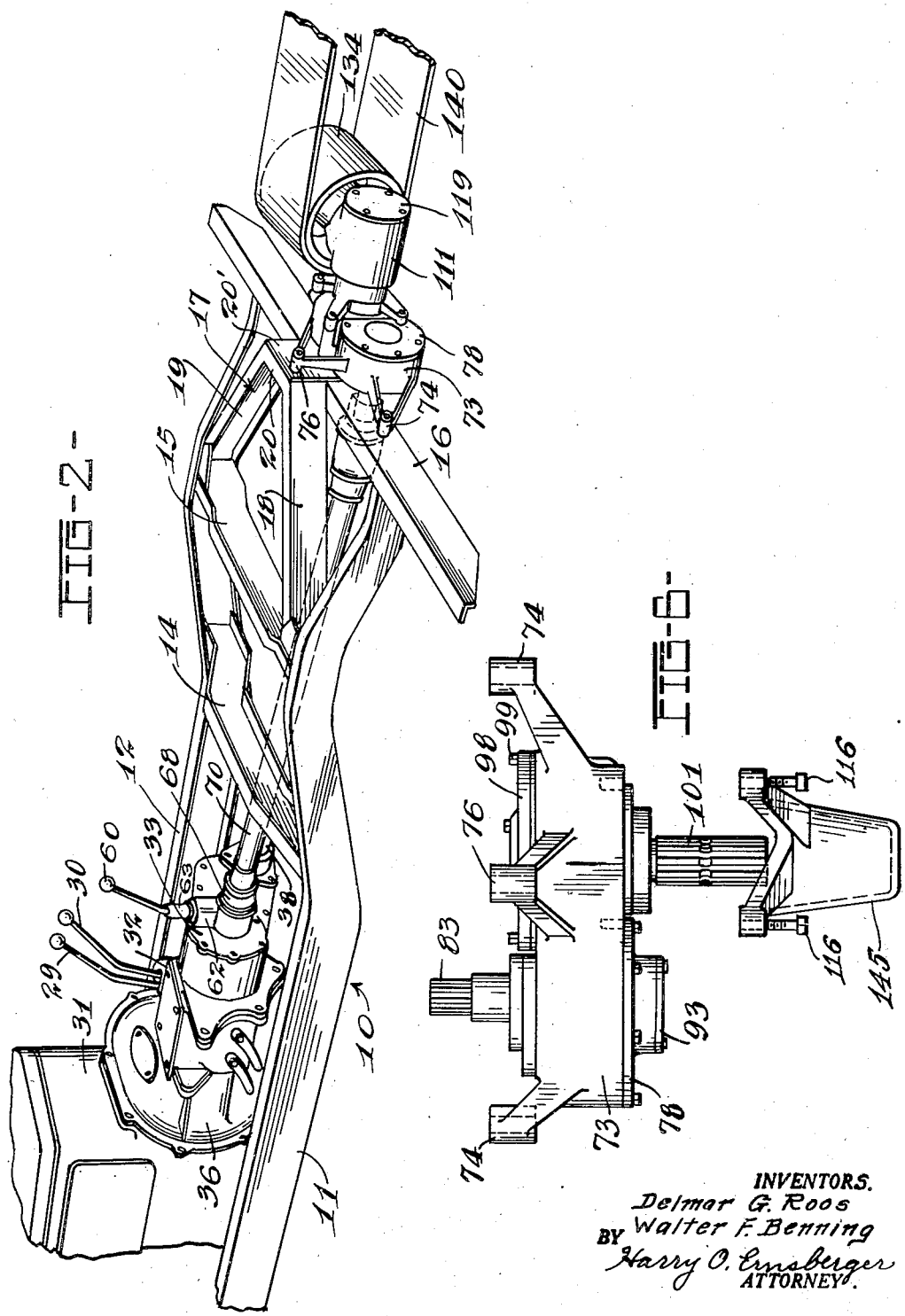

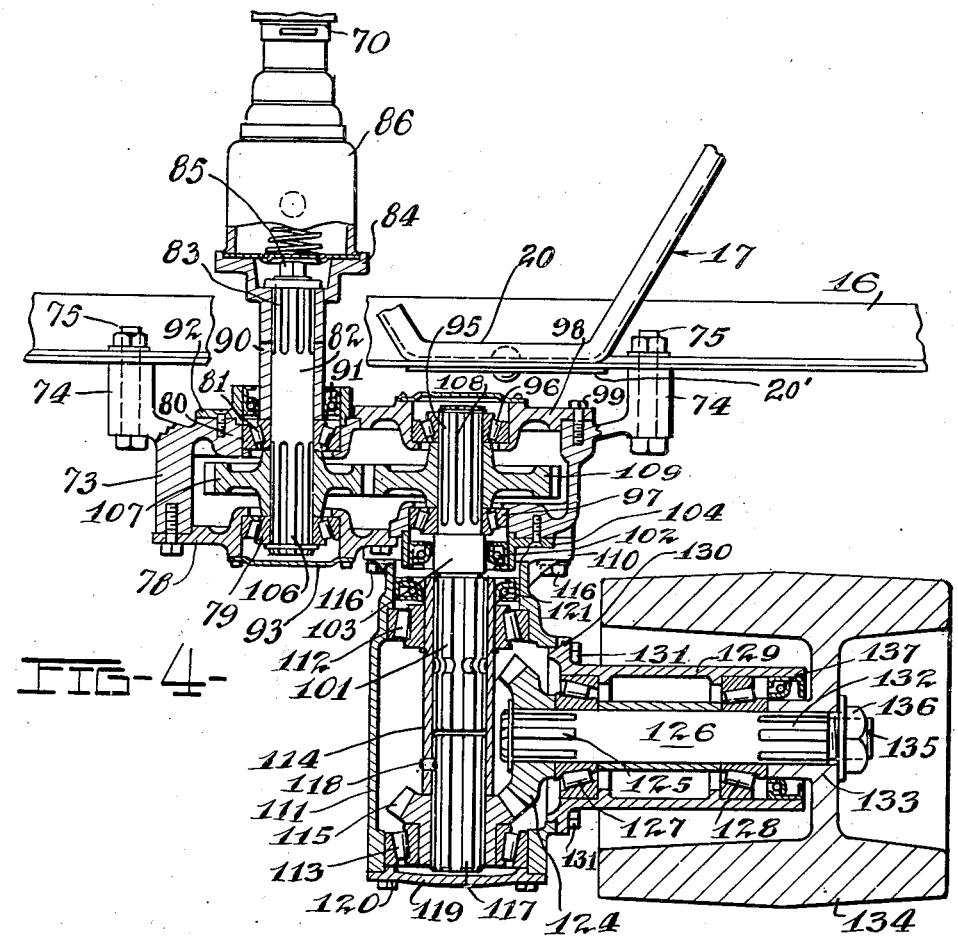
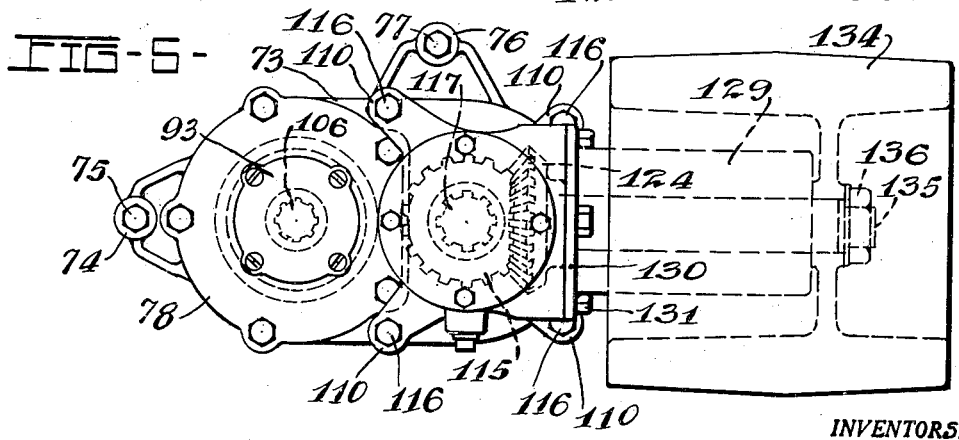

Patented Mar. 8, 1949

2,464,059

UNITED STATES PATENT OFFICE 2,464,059

POWER TAKE-OFF MECHANISM

Delmar G. Roos and Walter F. Benning, Toledo, Ohio, assignors to Willys-Overland Motors, Inc., Toledo, Ohio, a corporation of Delaware Application March 10, 1945, Serial No. 582,108

4 Claims. (Cl. 74—15.6)

This invention relates to power take-off mechanism for vehicles and more especially to power take-off units particularly usable with four wheel drive vehicles.

The invention embraces the provision of a power take-off unit supported independently of the vehicle power transmission mechanism but which is driven therefrom.

The invention comprehends a power take-off unit which is particularly adaptable for mounting at the rear of the vehicle frame where it is readily accessible for attachment to power consuming units, and which is driven by and through means connected with the vehicle power transmission gearing.

An object of the invention resides in the provision of a power take-off mechanism located at the rear of the vehicle and which is connected for actuation with the vehicle power transmission gearing through the medium of a clutch means so arranged that the clutch shifting lever may be disposed within convenient reach of the vehicle operator.

Another object of the invention resides in the provision of a power take-off unit disposed at the rear of the vehicle frame, and driven from the power transmission gearing of the vehicle, the power take-off unit being arranged to receive and be operatively connected with relatively stationary power consuming units, or which may be connected to wheeled units adapted to be towed by the vehicle in which a power connection is essential to their operation.

Another object of the invention resides in the provision of a power take-off unit embodying motion-reversing gearing in which the gears may be of different sizes and whose position may be reversed to secure different speed ratios between the power take-off shaft and its driving means.

Another object resides in the provision of a power take-off unit which is adapted to be connected to and operate various types and kinds of power consuming devices.

Still a further object is the provision of a power take-off unit which may be remotely positioned with respect to the mechanism from which it derives its power yet connected thereto by a flexible drive, thus enabling the utilization of the unit with various types of vehicle.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred in which:

Figure 1 is a side elevational view of a vehicle of the four wheel drive type illustrating a form of power take-off means of the invention in conjunction therewith;

Figure 2 is an isometric view illustrating a portion of the vehicle frame, the power take-off unit and its driving connection with the vehicle power transmission gearing;

Figure 3 is a vertical sectional view illustrating the clutch means for connecting and disconnecting the power take-off unit with the vehicle power transmission gearing;

Figure 4 is a horizontal detailed sectional view through the power take-off unit illustrating a driving pulley in operative association with the power take-off unit;

Figure 5 is a rear elevational view of the power take-off unit and drive pulley illustrated in Figure 4;

Figure 6 is a view of the portion of the power take-off unit showing the take-off shaft and temporary cap for protecting the power take-off shaft when not in use.

While there is illustrated a form of the invention as particularly usable with a four wheel drive vehicle, it is to be understood that the power take-off unit may be used with any mechanism wherein the same may be found to have utility.

Referring to the drawings in detail and initially to Figures 1 and 2, the invention is illustrated as embodied in a vehicle of the four wheel type in which all the wheels are driven. The vehicle illustrated embodies a frame 10 comprising longitudinally extending spaced side rails 11 and 12 which are joined together by means including transverse members 14, 15 and 16, the transverse members being secured to the side rails by welding, riveting or other suitable means. Secured to the side rails 11 and 12 extending rearwardly of the frame is a reinforcing member 17 formed with angularly disposed strut like portions 18 and 19 which are secured at their point of convergence 20 to the transversely extending frame member 16 arranged at the rear of the vehicle, the converging portion of member 17 being disposed above the transverse member 16 as particularly shown in Figure 2.

Mounted upon the frame structure 10 is a vehicle body 23 in which is disposed seats 24, the body terminating at its forward portion in a cowl 25 and hood 26 enclosing an engine or source of power 31. The vehicle is provided with a steering wheel 27 and transmission control or gear shifting lever 28 mounted upon the steering column and additional power transmission control levers, 29 and 30. The lever 28 is utilized for securing normal three speed ratios and reverse of the conventional transmission gearing mechanism contained within housing 32. Disposed at the rear of the transmission housing 32 is an auxilliary transmission gearing or mechanism contained within a housing 33 generally referred to as a transfer case. The housing 33 contains mechanism for selectively including a drive connection to the front wheels as well as to provide further lower ratio of vehicle speeds than those obtainable with the regular transmission mechanism. The control lever 29 provides a means for shifting a toothed clutch contained within the transfer case 33 to connect the transmission mechanism to the front wheels 37 through the medium of a forwardly disposed propeller shaft 36 to effect a transmission of power to the front wheels. The control lever 30 is connected with a shiftable gear (not shown) contained within the transfer case for effecting higher gear ratios for obtaining extremely low speeds for the vehicle than are obtainable by the use of the conventional three speed transmission of the character contained within the housing 32. It is to be understood that the gearing contained in the transfer case 33 operates in conjunction with the gearing contained in the transmission housing 32 to give a series of lower speeds and thus provide for the transmission of increased power to the drive wheels enabling the vehicle to operate in rough terrain or the like. A drive is established to the rear vehicle wheels 37' through the propeller shaft 38, the wheels being mounted upon an axle which is connected to the frame by means of multi leaf springs 39. The springs are connected at their forward ends to the frame side rails by means of brackets 40, the rear ends of the leaf springs being connected to brackets 41 carried by the frame 10 through the medium of shackles 42.

Power take-off mechanism is provided which is particularly adaptable for utilization with a vehicle of the character disclosed herein. The power take-off means or mechanism of the invention is adapted to be connected to the vehicle power transmission gearing so that the power for the take-off mechanism is obtained from the vehicle engine. As shown in Figure 3, a shaft 45 extends into the transfer case 33 which is driven by gearing contained within the transmission housing 32. Mounted upon shaft 45 is a gear 46 which is in operative engagement with other gearing in the transfer case (not shown) for obtaining a final drive to the fore and aft propeller shafts 36 and 38 respectively for driving the vehicle. Disposed in alignment with shaft 45 is a shaft 48 formed at one end with a series of clutch teeth 49 which are in alignment with a series of correspondingly shaped clutch teeth 50 formed on an integral extension of gear 46. The shaft 48 is journaled on suitable roller or other anti-friction bearings 51 mounted on a plate or member 53 forming a closure for the transfer case 33. A shiftable clutch or clutching gear 54 is mounted for axial slidable movement in the teeth 49 formed on shaft 48 and is relatively movable for inter-engagement with the clutch teeth 50 formed on gear 46 to establish an operative driving connection between shaft 45 and shaft 48. The clutching gear 54 is provided with a circumferential recess 55 into which projects a yoke 56 carried upon the end of a longitudinally disposed shifting rod 57. The rod 57 is provided at its end portion with a transverse pin 58 adapted to be straddled by a yoke formed at the lower end of a clutch shifting lever 59 having a manipulating knob 60 the lever being fulcrumed upon a pin 61 secured within an upwardly projecting portion 62 formed on the cover member 53. The opening at the upper end of hollow projection 62 is closed by means of a flexible boot 63 which permits unrestricted movement of clutch shifting lever 59 and serves to keep foreign matter from entering the housing 33.

Fixedly keyed upon shaft 48 is a flanged member 65 which is held in place by means of a bolt 66 threaded into an opening in the shaft 48. The flanged member 65 is connected to a casing 68 which encloses universal joint mechanism (not shown) which is connected to a drive shaft 70.

Secured to the rear vehicle frame members 16 and 17 is a power take-off unit comprising a casing or housing 73 which is formed with boss portions 74 bored to receive retaining bolts 75 fixedly securing the housing to transversely extending frame member 16. The housing 73 is also formed with a boss portion 76 adapted to be secured by means of a bolt 77 passing through the plate 20' and through the frame member 17 to provide added support for the casing 73. The housing 73 is provided with a removable plate 78 which carries a tapered roller or anti-friction bearing 79. The housing 73 is formed with a support or bridge 80 which carries a similar tapered roller bearing 81, a shaft 82 being journaled upon the roller bearings 79 and 81. The shaft 82 projects exteriorly and forwardly of the housing 73 and has its end portion splined as at 83 to receive a member 84 held in place upon the shaft 82 by means of a bolt 85. Secured to the flanged member 84 is a casing 86 similar to the casing 68 and encloses universal joint mechanism (not shown) to which is connected the rear end of the drive shaft 70. Also carried upon shaft 82 is a spacer sleeve 90 disposed between the member 84 and the inner race of bearing 81, an oil seal 91 surrounding the sleeve 90 and mounted in a removable plate 92 serves to prevent leakage of lubricant along the sleeve 90. The chamber in which bearing 79 is disposed is enclosed by means of a cover 93.

Arranged in parallelism with shaft 82 is a second shaft 95 which is journalled within the casing or enclosure 73 upon tapered roller bearings 96 and 97, bearing 96 being supported upon a removable plate 98, the latter secured to the casing by means of bolts 99, the bearing 97 being mounted in a recess formed in an integral wall portion of casing 73. The shaft 95 has a splined portion 101 which projects rearwardly and exteriorly of casing 73, an oil seal 102 being provided surrounding the unsplined portion 103 of shaft 95 to prevent escape of lubricant from the housing along the shaft 95. The oil seal 102 is mounted in a removable plate 104.

The portion of shaft 82 disposed within the housing 73 is splined as at 106 to receive a spur gear 107 arranged to rotate with the shaft 82. The portion of the shaft 95 within the casing 73 is splined as at 108 and upon the splined portion is mounted a spur gear 109, gear 109 being splined upon the shaft 95, the gears 107 and 109 being in constant enmeshment. By this means, rotation of the shaft 82 connected to a source of power causes rotation of shaft 108 in a reverse direction. In a power take-off mechanism of the character of our invention, it is desirable in some installations to change the ratio of the driven shaft 95 as compared with the speed of the driving shaft 82. This may be readily accomplished in our invention by forming gears 107 and 109 with a different number of teeth, for example, gear 109 may have 24 teeth and gear 107 provided wtih 20 teeth, under which condition shaft 95 will rotate slower than the driving shaft 82. If it is desired to increase the speed of the driven shaft 95, the gears 107 and 109 may be reversed, i. e. gear 109 may be placed upon shaft 82 and gear 107 placed upon shaft 95 as these gears are interchangeable.

The power take-off mechanism of our invention may be utilized for many and varied purposes. For example, if it is desired to transmit power to operate a corn picker, combine or other implement utilizing power, such implement may be connected to the splined portion 101 of shaft 95 and may be driven therefrom. The invention is adaptable for use with other types of power consuming units or accessories which may be connected to shaft 95 and derive power therefrom. While we have illustrated in Figures 4 and 5 of the drawings an arrangement wherein a pulley unit may be connected to be driven by shaft 95, it is to be understood that other power consuming units or accessories may be connected to be driven by shaft 95 in lieu of the pulley construction illustrated. The drive pulley unit is inclusive of a casing 111 within which is mounted spaced tapered roller or anti-friction bearings 112 and 113. The casing 111 is formed with bosses 110 which are bored to receive bolts or cap screws 116 for securing casing 111 to the enclosure or casing 73. Journaled in the bearing 112 is a sleeve 114 which is internally splined to cooperate with the splined portion 101 of shaft 95. Journaled on bearing 113 is a mitre gear 115 the hollow hub portion of which is internally splined to receive a splined stub shaft 117, the shaft 117 extending into and being in interengagement with the splines formed on sleeve 114. A plurality of openings are formed in the walls of sleeve 114 to accomodate welding material 118 so that sleeve 114 is fixedly secured to shaft 117 whereby these elements rotate together. The end of casing 111 is closed by means of a cover 119 held in place by means of screws 120, the cover also serving to secure the bearing 113 in proper position. An oil seal 121 surrounds the sleeve 114 so that lubricant contained within casing 111 will not seep along the sleeve 114.

The mitre gear 115 is in mesh with a mitre gear 124 which is disposed upon the splined end 125 of a shaft 126, the latter being arranged substantially at right angles to shaft 95. The shaft 126 is journaled upon spaced tapered roller bearings 127 and 128 mounted within a cylindrical housing 129, the latter being formed with a flange portion 130 which is secured to casing 111 by means of bolts 131. The shaft 126 has a splined portion 132 upon which is mounted a correspondingly splined hub portion 133 of a drive pulley 134. The extremity of shaft 126 is formed with a threaded tenon 135 to receive a nut 136 for securing the drive pulley 134 upon shaft 126. An oil seal 137 is interposed between the end of the housing 129 and the hub portion 133 of the drive pulley in order to prevent escape of lubricant from the housing 129.

It is to be noted that by simply removing the bolts 116, the casing 111, casing 129 and drive pulley 134 including their associated elements may be removed as the splined sleeve 114 is slidable upon the splined portion 101 of shaft 95. The casings or housings 111 and 129 are adapted to contain a supply of lubricant retained therein by the oil seals 121 and 137. Thus the pulley unit may be removed from engagement with shaft 95 without loss of lubricant and reconnected for use without relubrication. Through the arrangement of our invention other power consuming units such as compressors, pumps or the like may be secured to casing 73 by means of the bolts 116 and power transmitted to such power consuming units through engagement of driven means with the splined portion 101 of shaft 95.

In the normal operation of the power take-off means with the drive pulley unit connected to casing 73 as illustrated in the drawings, power is derived from the vehicle engine 31 through the transmission gearing to the gear 46. When the lever 59 is shifted to bring the shiftable gear 54 into engagement with teeth 49 formed on shaft 46 and with clutch teeth 50 on gear 46 an operative connection is established through the drive shaft 70 to the drive shaft 82. As gear 107 rotates with shaft 82, the gear transmits rotary movement to gear 109 thence to shaft 95 through sleeve 114 to the mitre gear 115. Mitre gear 115 being in mesh with mitre gear 124, shaft 95 rotates shaft 126 upon which is secured the drive pulley 134 to transmit power to the drive pulley 134. It is to be understood that any type of mechanism utilizing power may be connected by a belt 140 to the drive pulley 134. To disconnect the transmission of power to the take-off unit, it is only necessary to shift the lever 59 to a neutral position, that is, wherein the shiftable clutch gear 54 is out of engagement with the teeth formed on gear 46. It should be noted that through the use of the shaft 70 and the universal joints associated with each end thereof, the casing 73 may be positioned remotely from the transmission gearing in any convenient position upon the vehicle frame or other suitable support.

When the power take-off mechanism is not in use and accessories are disconnected therefrom, the splined portion 101 of shaft 95 may be enclosed by a cover or closure 145, the latter being shown in disassembled position with respect to shaft 101 as illustrated in Figure 6. The cover may be secured to casing 73 by means of the bolts 116.

It is apparent that, within the scope of the invention, modifications and different arrangements may be made other than is herein disclosed, and the present disclosure is illustrative merely, the invention comprehending all variations thereof.

What we claim is:

1. A power take-off unit adapted to be removably secured to a vehicle frame, said unit including a casing; a plurality of arms integrally formed with said casing; means for securing said arms to the vehicle frame; a pair of cover plates secured to said casing; two pairs of aligned anti-friction bearings mounted in said cover plates; a shaft journaled on one pair of aligned bearings and having a splined portion projecting through one of said cover plates and adapted to be connected to a source of power; a second shaft journaled upon the other pair of aligned bearings and having a splined portion projecting through the other of said cover plates; said second shaft being arranged to be connected to a power consuming unit; enmeshing spur gears disposed within said casing and respectively carried by said shafts whereby rotation of one shaft is communicated to the other.

2. A power take-off unit adapted to be removably secured to a vehicle frame, said unit including a casing; a plurality of arms integrally formed with said casing; means for securing said arms to the vehicle frame; a pair of cover plates secured to said casing; two pairs of aligned antifriction bearings mounted in said cover plates; a shaft journaled on one pair of aligned bearings and having a splined portion projecting through one of said cover plates and adapted to be connected to a source of power; a second shaft journaled upon the other pair of aligned bearings and having a splined portion projecting through the other of said cover plates; said second shaft being arranged to be connected to a power consuming unit; enmeshing spur gears disposed within said casing and respectively carried by said shafts whereby rotation of one shaft is communicated to the other; said power consuming unit including a housing; a pair of shafts journaled in said housing and arranged substantially at right angles to each other; gearing mounted in said housing and connecting said latter mentioned shafts; a pulley secured to one of the shafts journaled in said housing; and means associated with the other of said shafts and arranged to be telescopingly connected to the splined portion of the shaft projecting from said casing.

3. Power take-off mechanism including a main casing adapted to be secured to the frame of a vehicle; a pair of stub shafts journaled within said main casing; one of said shafts projecting forwardly of the main casing and adapted to be connected to a source of power, the other of said shafts having a projecting portion extending rearwardly of the main casing; gearing connecting said stub shafts whereby one shaft is driven by the other; a supplemental casing; means for removably securing the supplemental casing to the main casing; the projecting portion of the driven stub shaft adapted to extend into the supplemental casing; a shaft journaled upon said supplemental casing and arranged to be driven by said driven stub shaft, and a pulley mounted upon the shaft carried by the supplemental casing.

4. Power take-off mechanism including a main casing adapted to be secured to the frame of a vehicle; a pair of stub shafts journaled within said main casing; one of said shafts projecting forwardly of the main casing and adapted to be connected to a source of power, the other of said shafts having a projecting portion extending rearwardly of the main casing; means including a pair of gears connecting said shafts whereby one shaft is driven by the other; said gears being of different diameters whereby a reversal of the same may be effected to change the speed ratio between said shafts; a supplemental casing; means for removably securing the supplemental casing to the main casing; the projecting portion of the driven stub shaft adapted to extend into the supplemental casing; a shaft journaled upon said supplemental casing and arranged to be driven by said driven stub shaft, and a pulley mounted upon the shaft carried by the supplemental casing.

DELMAR G. ROOS.
WALTER F. BENNING.

REFERENCES CITED

The following references are of record in the file of this patent:

UNITED STATES PATENTS

| Number | Name | Date |
|---|---|---|
| 119,909 | Wright et al. | Oct. 10, 1871 |
| 1,645,224 | Brown | Oct. 11, 1927 |
| 1,792,584 | Haight | Feb. 17, 1931 |
| 1,872,924 | Galanot | Aug. 23, 1932 |
| 1,913,567 | Ritchie | June 13, 1933 |
| 1,986,147 | Gustafson | Jan. 1, 1935 |
| 2,158,320 | Bock | May 16, 1939 |
| 2,287,279 | Stumpf | June 23, 1942 |
| 2,317,957 | Frudden | Apr. 27, 1943 |
| 2,395,108 | Donley et al. | Feb. 10, 1946 |

FOREIGN PATENTS

| Number | Country | Date |
|---|---|---|
| 451,085 | Germany | Oct. 12, 1926 |